United States Patent Office 3,128,150
Patented Apr. 7, 1964

3,128,150
PROCESS FOR PRECONDITIONING THE CARBON BED USED IN A METHOD OF CONVERTING REFRACTORY METAL OXYCHLORIDES
James A. Brothers, Trenton, Mich., assignor to Wyandotte Chemicals Corporation, Wyandotte, Mich., a corporation of Michigan
No Drawing. Filed June 28, 1961, Ser. No. 120,200
5 Claims. (Cl. 23—87)

This invention relates to the production of refractory metal chlorides. In particular, it relates to a method of producing refractory metal chlorides which are substantially free of metal oxychlorides. More particularly, this invention relates to a method of producing a preconditioned carbon, the use of which makes possible a highly efficient continuous process for the production of refractory metal chlorides.

In the ensuing discussion, this invention will be described primarily with reference to columbium metal production. However, it should be understood that the discussion is equally applicable to vanadium, tungsten and molybdenum metals.

In recent years, increased interest has been shown in the so-called "refractory metals" such as columbium, vanadium, tungsten and molybdenum. Accordingly, a great deal of work is being done to produce these metals with one of the basic approaches being the reduction of the metal halide. For example, columbium pentachloride is being employed in the production of columbium metal. Thus, in order to obtain metal of the highest purity it is necessary that the columbium pentachloride be of the highest quality and substantially free of oxygen contamination since the presence of oxygen molecules imparts undesirable properties to the metal. The term "substantially free of oxygen contamination" is used to designate metal having less than 0.020 weight percent oxygen. While the art has progressed to quite an advanced state in techniques to utilize columbium pentachloride, it has not as yet developed an adequate and efficient method for continuously producing columbium pentachloride in a sufficiently pure state.

A method for producing columbium pentachloride which has found wide acceptance in the art is the chlorination of columbium oxide to produce columbium pentachloride. However, inherent in such a method is the formation of columbium oxytrichloride. In fact, depending on conditions, more oxytrichloride can be formed than pentachloride. The presence of oxytrichloride in the pentachloride causes serious and difficult problems in that oxytrichloride is a direct source of oxygen contamination of the metal. Moreover, oxytrichloride is extremely difficult to handle since it is not easily separated from the pentachloride and tends to sublime and plug the metal producing system.

Since the formation of columbium oxytrichloride is inherent in the production of columbium pentachloride, various methods were proposed to convert columbium oxytrichloride to columbium pentachloride. A method for doing this which has found wide acceptance in the art is the chlorination of columbium oxytrichloride in the presence of carbon which may be shown as follows:

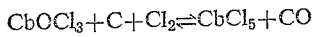

$$CbOCl_3 + C + Cl_2 \rightleftharpoons CbCl_5 + CO$$

This method is generally carried out by passing vaporized columbium oxytrichloride or a mixture of columbium oxytrichloride and columbium pentachloride and chlorine through a carbon bed heated to a temperature in excess of 500° C. Generally, about a 10 percent excess of chlorine over the stoichiometric quantity required for the chlorination is employed. The chlorine and columbium oxytrichloride may be introduced to the carbon bed via the same gas stream or via separate streams.

The difficulty, however, in using the above method is that the initial columbium oxytrichloride or mixture containing same passed through the carbon bed is not completely converted to columbium pentachloride. As additional oxytrichloride is passed through the carbon bed a slightly increased percentage is converted to the pentachloride and finally after an appreciable length of time essentially 100 percent conversion takes place. Thus, during this time interval before complete conversion is achieved a great deal of columbium oxytrichloride is passed through the bed and again the aforementioned problems of oxytrichloride contamination are encountered. In addition to the difficulty cited above, it was impossible to run a continuous process for producing pure columbium pentachloride because the carbon bed is consumed in converting the oxytrichloride to pentachloride and, hence, as soon as the charge of carbon is depleted in the course of the reaction and new carbon is added, oxytrichloride is again found in the chlorides coming off the carbon bed, thereby contaminating the system.

It is an object of this invention to overcome the aforementioned problems by providing a preconditioned carbon so that on passing refractory metal oxychlorides and chlorine through the preconditioned carbon all the metal oxychloride is converted to metal chloride.

A further object is to provide a carbon material which will provide a continuous process for the production of refractory chlorides.

Other objects and advantages of this invention will be apparent from the ensuing description.

The objects of this invention are attained by producing a preconditioned carbon by a method which comprises heating the carbon to a minimum temperature of about 200° C. and passing a chlorinating agent through the carbon until the off-gas from the carbon is essentially the chlorinating agent. On passing a refractory metal oxychloride and chlorine or a mixture containing refractory metal chloride and oxychloride and chlorine through the preconditioned carbon, immediate and complete conversion to the refractory metal chloride is obtained without any contamination due to oxychlorides.

The method of this invention is not dependent upon the use of any particular chlorination agent. Chlorine gas, either undiluted or diluted with inert gases, is preferred because it is easy to work with and relatively inexpensive; however, any good chlorinating agent, such as a chlorinated organic compound having labile chlorine atoms, is usable. In addition to chlorine, good results are attained when phosgene or carbon tetrachloride is used as the chlorinating agent.

The carbon material from which the preconditioned carbon of this invention can be produced can be any type of carbon used in converting metal oxychlorides to chlorides. I have found that activated carbon is an excellent starting material for the production of preconditioned carbon. A description of activated carbon and its method of preparation can be found in the "Encyclopedia of Chemical Technology," by Kirk-Othmer, volume 2, pp. 881–898 (1948). In addition to activated carbon, experimentation has been conducted on other types and forms of carbon material to determine their suitability as preconditioned carbon when treated by the method of this invention.

I have found that any amorphous carbon or any carbon mixture which contains amorphous carbon can be used in the method of this invention. Good results are obtainable when charcoal and petroleum coke are used in this invention.

In a preferred embodiment of this invention, the carbon to be preconditioned is placed into a tube and heated to a temperature of at least 200° C. The chlorinating agent is then passed through the carbon until the gas coming off the carbon is essentially the chlorinating agent. For example, it was observed that as chlorine was passed through the carbon the initial exit gas consisted essentially of carbon monoxide, carbon dioxide and organic and inorganic chlorides. On continuing to pass chlorine through the carbon, the exit gas composition contained some chlorine as well as carbon monoxide, carbon dioxide and chlorides. Finally, on continued passage of chlorine through the carbon, the exit gas consisted essentially of chlorine. The carbon was converted into the preconditioned state that is needed for use in the method of the invention when the off-gas from the carbon was essentially chlorine, that is, about 100% chlorine. It should be noted, however, that when the preconditioned state for the carbon is attained, the off-gas may contain traces of other gases such as carbon monoxide. When working with transparent equipment, the carbon is preconditioned when the characteristic greenish-yellow color of chlorine is seen in the off-gas.

In order to place the carbon in a preconditioned state, it is necessary that the carbon be heated to at least 200° C. There is no upper temperature limitation on the preconditioning process other than practical and economic considerations. The preferred temperature range for preconditioning is from about 500° C. to about 1,000° C. Apparently, the chlorinating agent causes oxygen-containing hydrocarbons to be removed from the carbon and it has been found that at a temperature below about 500° C. this hydrocarbon purification proceeds at a very slow rate. It is also pointed out that pressure is not a critical factor in this invention. Pressure either below or above atmospheric may be employed, but no advantage is seen in doing so.

Another feature of this invention which has considerable merit over other methods found in the art is that once the carbon has been converted to preconditioned carbon it can then be conveniently stored for later use without any need for additional treatment at the time of use. Thus, for example, columbium oxytrichloride can be converted to columbium pentachloride in a continuous process without any danger of oxytrichloride contamination when the preconditioned carbon of this invention is used as the carbon reactant. In the reaction, which can be represented as follows:

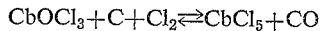

the carbon is consumed and must be replenished. As stated earlier, it was impossible by presently known methods to conduct the above reaction in a continuous manner since each time the carbon was replenished the initial chlorides through the fresh carbon contained a substantial amount of oxytrichloride. Now, by using the preconditioned carbon of this invention, it is possible to replenish the carbon with preconditioned carbon, which was produced and stored at some prior time, without any danger of contaminating the product with oxytrichloride.

In a more specific embodiment of this invention, a carbon bed is heated to a minimum temperature of about 200° C. and a chlorinating agent is passed through the bed until the off-gas is essentially the chlorinating agent. Then a mixture of a refractory metal chloride and oxychloride or the oxychloride alone, wherein the metal portion thereof is selected from columbium, vanadium, tungsten or molybdenum, is heated to the vapor phase and passed, along with chlorine gas, through the carbon bed and the refractory metal chloride is collected as the product gas emanating from the carbon bed. Generally, the amount of chlorine passed through the bed is about 10% in excess of the stoichiometric amount required for the conversion of the metal oxychloride to the metal chloride. It should be noted that the carbon bed must be maintained at a minimum temperature of 200° C. during the preconditioning process. However, when the preconditioned carbon is used in converting metal oxychlorides to metal chlorides it must be heated to a minimum temperature of 450° C. This minimum temperature is necessary in order to initiate and maintain, at a reasonable rate, the reaction of the preconditioned carbon with the metal oxychloride and chlorine. The particular temperature to which the preconditioned carbon is heated will vary depending upon the refractory metal involved. For example, when using the preconditioned carbon to convert columbium oxytrichloride, the preferred temperature to which the carbon is heated is in the range of 600° C. to 900° C.

When the method of this invention is applied to a continuous process, the refractory metal oxychloride or chloride-oxychloride mixture is heated until it is in the vapor phase and passed, along with chlorine, through the preconditioned carbon and the refractory metal chloride is collected as the product gas emanating from the preconditioned carbon bed. As the refractory metal chloride-oxychloride mixture is continuously fed through the preconditioned carbon bed, the bed will become depleted due to its consumption in the reaction. Fresh preconditioned carbon is then added to the bed and the reaction is continued with no appearance of oxychloride in the product.

The following examples are offered as illustrations of this invention and are not to be construed as limitations thereof:

*Example I*

This example illustrates the preparation of preconditioned carbon using activated carbon as the starting material. A bed of activated carbon was deposited in a two-inch diameter "Vycor" tube which had a length of two feet and a tapered inlet and outlet. The Vycor glass tube was mounted in a vertical position and the bed depth was 19 inches. The activated carbon used in this example was a 3/16-inch pellet manufactured by the National Carbon Company and sold under the name of "Columbia" CXC4/6. The activated carbon bed was electrically heated to a temperature of 700° C. and then chlorine gas was passed up through the bed at a rate of 1200 cubic centimeters per minute, corresponding to a superficial residence time of approximately 32 seconds, for one hour, at which time the end of the preconditioning process was evidenced by the high concentration of chlorine in the off-gas. The high concentration of chlorine was shown by the characteristic greenish-yellow chlorine color in the off-gas.

*Example II*

This example illustrates the preparation of preconditioned carbon from hardwood charcoal. The hardwood charcoal used in this example is available at retail stores and is of the type commonly used in outdoor cooking. The reactor used was the same as that described in Example I. 500 grams of hardwood charcoal were deposited in the reactor and heated to a temperature of 700° C. Chlorine was then passed up through the bed at a rate of 1200 cubic centimeters per minute. The chlorination was terminated after two hours when a high concentration of chlorine was evidenced in the off-gas.

*Example III*

The reactor used in this example was the same as that described in Example I. 500 grams of pellets composed of pyrochlore concentrate, coke and bentonite, representing a columbium metal content of 82 grams, were heated to a temperature of 550° C. Chlorine was then passed through this pellet bed at the rate of 1200 cubic centimeters per minute. The chlorides coming off the bed were condensed and analyzed. The analysis revealed that the product vapors contained the columbium entirely as columbium oxychloride. The above example shows clearly that the chlorination of a refractory metal ore or oxide does not produce the desired pure refractory metal chloride.

*Example IV*

The following example illustrates the effectiveness of preconditioned charcoal, produced by the method of this invention, in producing pure refractory metal chloride in comparison to charcoal which has not been preconditioned.

The reactor used in this example was the same as that described in Example I. 500 grams of pellets composed of pyrochlore concentrate, coke and bentonite, representing a columbium metal content of 82 grams, were heated to a temperature of 650° C. Chlorine was then passed through the pellets at a rate of 1260 cubic centimeters per minute. The chloride vapors and reaction gases of carbon dioxide and carbon monoxide, along with residual chlorine coming off the pellet bed, were passed to the reactor which contained 250 grams of crushed charcoal. The crushed charcoal was in the form of ⅛-inch to ¼-inch particles and was heated to a temperature of about 750° C. Excess chlorine was fed into the charcoal bed along with the chloride vapors. The metal chloride vapors coming off the charcoal were condensed and analyzed. The analysis revealed that approximately 35% of the columbium in the mixed metal chlorides existed as columbium oxychloride.

A second run was then made in which the chloride vapors and reaction gases of carbon dioxide and carbon monoxide, along with residual chlorine, coming off the pellet bed were passed through preconditioned charcoal with a 10% stoichiometric excess of chlorine. This charcoal had been previously conditioned by passing chlorine through the charcoal, the charcoal being at a temperature of about 600° C., at a rate of 1200 cubic centimeters per minute for a period of two and one-half hours until the off-gas was essentially chlorine. The metal chloride vapors leaving the preconditioned charcoal bed were condensed and analyzed. The analysis revealed that the columbium metal existed entirely as columbium pentachloride, the Cl to Cb ratio being 5 to 1.

*Example V*

This example illustrates the superior refractory metal chloride obtained by the use of preconditioned active carbon in comparison with that obtained by using active carbon.

The reactor used in this example was the same as that described in Example I. 500 grams of pellets composed of columbium pyrochlore concentrate, coke and bentonite, representing a columbium metal content of 82 grams were heated to a temperature of 550° C. Chlorine was passed through the pellets at a rate of 1260 cubic centimeters per minute and chlorine vapors and reaction gases of carbon dioxide, carbon monoxide and residual chlorine coming off the pellet bed were passed through the reactor along with a 10% stoichiometric excess of chlorine. The reactor contained 500 grams of activated carbon heated to a temperature of 750° C. The activated carbon was in the form of 3/16-inch pellets and is manufactured and sold by the National Carbon Company under the name of "Columbia" CXC4/6. The metal chloride vapors coming off the activated carbon bed were condensed and analyzed. The analysis showed 50% of the columbium was in the form of columbium oxychloride.

A second run was then made in which the product vapors and gases coming off the pellet bed, along with a 10% stoichiometric excess of chlorine, were passed through activated carbon which had been preconditioned. The preconditioning of the activated carbon was done by heating the activated carbon to a temperature of 750° C. and passing chlorine through it at a rate of 850 cubic centimeters per minute for one and one-half hours until the off-gas was essentially chlorine. Analysis of the metal chloride vapors coming off the preconditioned active carbon bed showed that columbium pentachloride had an oxygen content of less than 100 p.p.m. The actual oxygen content was probably substantially less than 100 p.p.m., but the method of analysis used has a lower limit of detection of 100 p.p.m.

It will be apparent from the foregoing description that the objectives of this invention have been attained. I have invented a method for the 100% conversion of refractory metal oxychloride to refractory metal chloride in a single pass reaction. This single pass method is made possible by the discovery of a method to prepare a unique preconditioned carbon.

I claim:

1. In a method of converting refractory metal oxychlorides, wherein the metal portion thereof is selected from the group consisting of columbium, vanadium, tungsten and molybdenum, to the corresponding refractory metal chloride by heating a carbon bed, wherein the carbon is selected from the group consisting of amorphous carbon and carbon mixtures containing amorphous carbon, to a minimum temperature of 450° C. and passing through said bed said refractory metal oxychloride and a chlorinating agent, said agent being about 10 percent in excess of the stoichiometric amount required for the conversion of metal oxychloride to metal chloride, the improvement which comprises preconditioning the carbon of said bed by heating the carbon to a minimum temperature of 200° C. and passing chlorine through said carbon until the off-gas from said carbon is essentially chlorine.

2. The method of claim 1 wherein said carbon bed is comprised of activated carbon.

3. The method of claim 1 wherein said carbon bed is comprised of charcoal.

4. The method of claim 1 wherein said carbon is at a temperature of about 500° C. to about 1000° C. during said preconditioning.

5. In a method of converting columbium oxytrichloride to columbium pentachloride by heating an activated carbon bed to a minimum temperature of 450° C. and passing through said bed said columbium oxytrichloride and gaseous chlorine, said chlorine being about 10 percent in excess of the stoichiometric amount required for the conversion of metal oxychloride to metal chloride, the improvement which comprises, preconditioning said activated carbon by heating said activated carbon to a minimum temperature of 200° C. and passing chlorine through said activated carbon until the off-gas from said activated carbon is essentially chlorine.

References Cited in the file of this patent

UNITED STATES PATENTS

| | | |
|---|---|---|
| 1,303,362 | Mott | May 13, 1919 |
| 1,509,605 | McKee | Sept. 23, 1924 |
| 1,544,328 | McAfee | June 30, 1925 |
| 1,815,525 | Power | July 21, 1931 |
| 2,149,671 | Franck et al. | Mar. 7, 1939 |
| 2,914,383 | Ulrich | Nov. 24, 1959 |
| 2,969,852 | Jacobson | Jan. 31, 1961 |
| 3,009,773 | Dunn | Nov. 21, 1961 |
| 3,012,876 | Eaton et al. | Dec. 12, 1961 |

FOREIGN PATENTS

| | | |
|---|---|---|
| 801,386 | Great Britain | Sept. 10, 1958 |
| 588,085 | Canada | Dec. 1, 1959 |

OTHER REFERENCES

Urazov et al.: Chem. Abs., vol. 31, pages 4460 (1937).
Sue: Chemical Abstracts, vol. 33, page 3714 (1939).